(12) United States Patent
Kat

(10) Patent No.: US 9,268,098 B2
(45) Date of Patent: Feb. 23, 2016

(54) FIBER BRAGG GRATING INTERROGATOR ASSEMBLY AND METHOD FOR THE SAME

(71) Applicant: Technobis Group B.V., Alkmaar (NL)

(72) Inventor: Pieter Lucas Kat, Alkmaar (NL)

(73) Assignee: Technobis Group B.V., Alkmaar (NL)

(*) Notice: Subject to any disclaimer, the term of this patent is extended or adjusted under 35 U.S.C. 154(b) by 0 days.

(21) Appl. No.: 14/296,978

(22) Filed: Jun. 5, 2014

(65) Prior Publication Data

US 2014/0363126 A1      Dec. 11, 2014

(30) Foreign Application Priority Data

Jun. 7, 2013   (NL) ..................................... 2010940

(51) Int. Cl.
*G02B 6/34* (2006.01)
*G01B 11/16* (2006.01)
*G01D 5/353* (2006.01)

(52) U.S. Cl.
CPC *G02B 6/34* (2013.01); *G01B 11/18* (2013.01); *G01D 5/35316* (2013.01); *G01D 5/35335* (2013.01); *G01D 5/35387* (2013.01)

(58) Field of Classification Search
CPC .............. G02B 6/12007; G02B 6/124; G02B 6/29395; G02B 2006/12107; G02B 6/34; H04J 14/02
USPC ..................... 385/15, 24, 31, 37, 39
See application file for complete search history.

(56) References Cited

U.S. PATENT DOCUMENTS

2008/0129982 A1* 6/2008 Nakamura et al. .............. 356/73
2008/0309945 A1   12/2008 Kojima et al.

FOREIGN PATENT DOCUMENTS

EP         1927837 A2    6/2008

OTHER PUBLICATIONS

International Search Report for, The Netherlands No. 2010940; dated Jul. 6, 2013.

*Primary Examiner* — Jennifer Doan
(74) *Attorney, Agent, or Firm* — International IP Law Group, PLLC

(57) ABSTRACT

A fiber Bragg grating interrogator assembly is described. Examples of the fiber Bragg grating interrogator assembly include an optical fiber including a fiber Bragg grating having a variable Bragg wavelength ($\lambda_B$) and a dynamic range of interest ($\Delta\lambda_{dyn,B}$) over which the Bragg wavelength ($\lambda_B$) can shift during use. The fiber Bragg grating interrogator assembly also includes a response analyzer having a spectrally selective device with an input port to which the optical fiber is operably connected, and a plurality of output ports of which each output port is associated with a respective spectral range ($\Delta\lambda_n$). The spectral ranges ($\Delta\lambda_n$, $\Delta\lambda_{n+1}$, $\Delta\lambda_{n+2}$) of each at least three successive output ports partially overlap, such that the FBG's Bragg wavelength ($\lambda_B$) falls inside the spectral ranges ($\Delta\lambda_n$, $\Delta\lambda_{n+1}$, $\Delta\lambda_{n+2}$) of at least three successive output ports over the dynamic range of interest ($\Delta\lambda_{dyn,B}$) of the FBG.

15 Claims, 2 Drawing Sheets

FIBER BRAGG GRATING INTERROGATOR ASSEMBLY AND METHOD FOR THE SAME

CROSS REFERENCE TO RELATED APPLICATION

This application claims priority to The Netherlands Patent Application Serial No. NL 2010940 7, filed Jun. 7, 2013.

BACKGROUND

In the field of aerospace, the use of strong and light weight composite materials is increasing. A notorious drawback of these materials is that the process of their failure is rather complex, and damage may develop virtually invisibly from within composite structures, such as aircraft wings and wind turbine blades. To prevent accidents, regular manual inspection of these structures may therefore be required.

It has been suggested to automate the surveillance of mechanically loaded structures by means of an active health monitoring system including a fiber Bragg grating (FBG) sensor that is interrogated by an arrayed wave guide (AWG) based interrogator, which system may infer the existence of various kinds of damage to the monitored structure from changes in the Bragg wavelength. In such health monitoring systems the initial Bragg wavelength of an FBG sensor may typically be situated between the respective center wavelengths of two associated output ports or output channels of the AWG, such that a response provided by the FBG sensor upon interrogation is divided between those ports. When, during use, the Bragg wavelength of the FBG changes due to the fact that it is strained, the power ratio between the two output ports also changes.

SUMMARY

The present invention relates to a fiber Bragg grating interrogator assembly, and to a method for interrogating a fiber Bragg grating.

One drawback of the above-described configuration of an FBG/AWG health monitoring system is that the sensitivity of the system is greatest when the initial Bragg wavelength is located precisely between the center wavelengths of the two associated output ports of the AWG. It is rather difficult, however, to effect this condition on installation. Accordingly, a freshly installed health monitoring system may generally have a less than optimal sensitivity. Another drawback is that an FBG sensor may preferably have a relatively large dynamic range over which its Bragg wavelength may shift during use. Consequently, a Bragg wavelength may easily shift outside the spectral range of at least one of the output ports, which may render an accurate wavelength determination impossible.

It is an object of the present invention to provide for a fiber Bragg grating interrogator assembly and a corresponding method of interrogating a fiber Bragg grating that overcome or mitigate one or more of the aforementioned drawbacks.

To this end, a first aspect of the present invention is directed to a fiber Bragg grating interrogator assembly. The fiber Bragg grating interrogator assembly may comprise an optical fiber including a fiber Bragg grating (FBG). The FBG may have a variable Bragg wavelength and a dynamic range of interest over which the Bragg wavelength may shift during use. The assembly may also comprise a light source that is operably connected to the optical fiber, and configured to illuminate the fiber Bragg grating to solicit a response therefrom. The fiber Bragg grating interrogator assembly may further comprise a response analyzer, which may include a spectrally selective device having an input port and a plurality of output ports. The input port may be operably connected to the optical fiber, while each of the output ports may be associated with a respective spectral range, and the spectrally selective device may be configured to provide a spectral energy distribution of a response of the FBG that is received on the input port, onto the output ports. The respective spectral ranges of each at least three successive output ports of the plurality of output ports may exhibit a mutual partial overlap, such that the FBG's Bragg wavelength falls inside the spectral ranges of at least three successive output ports over the dynamic range of interest of the FBG.

In the presently disclosed FBG interrogator assembly an FBG is not associated with only two output ports of the spectrally selective device having non-overlapping spectral ranges, but with a plurality of output ports of which each at least three successive output ports exhibit a mutual partial spectral overlap (preferably such that the spectral range of each output port of a set of at least three successive output ports partially overlaps with the respective spectral ranges of each of the other output ports of the set of at least three successive output ports). The partial overlap of the spectral ranges of successive output ports ensures that signal power in a response of the FBG—i.e. in the FBG's transmission or reflection power spectrum—is not lost in between (the spectral ranges of) the output ports. Similarly, it prevents the FBG's response from hiding in between (the spectral ranges of) successive output ports, in particular when its power spectrum is relatively narrow. Furthermore, the distribution of the power spectrum of the FBG's response over at least three successive output ports increases the sensitivity of the assembly, and enables a very accurate determination of the Bragg wavelength of the FBG. This determination may take place by weighing the relative strengths (e.g. photon fluxes, or intensities) of the signals received on the respective output ports, so as to locate the center or peak of the FBG's power spectrum whose approximate shape is known. To ensure the usability of the FBG throughout its entire dynamic range of interest at an approximately constant sensitivity, the spectrally selective device may be configured so that the Bragg wavelength of the FBG falls inside the spectral ranges of at least three successive output ports over substantially the entire dynamic range of interest of the FBG. The presently proposed configuration of the interrogator assembly thus provides for an improved sensitivity to changes in the Bragg wavelength, and overcomes the need to ensure that the FBG Bragg wavelength is not affected when applying it to a structure to be monitored, or to readjust the spectral ranges of the output ports relative to the Bragg wavelength of the FBG after application.

In one embodiment the fiber Bragg grating interrogator assembly may further comprise a plurality of photodetectors that are optically coupled to the plurality of output ports in a one-to-one relationship. Each photodetector may be configured to generate a signal indicative of a strength of an optical signal received at the respective output port. The assembly may also comprise a processing unit that is operably connected to the plurality of photodetectors, and configured to determine a current Bragg wavelength of the FBG from the signals of the photodetectors.

In yet another embodiment of the fiber Bragg grating interrogator assembly, the response analyzer, typically including the spectrally selective device, the plurality of photodetectors and the processing unit, may be embodied by a single optical-electronic integrated circuit. Such an response analyzer in a single IC-package, accommodating optical signal analysis, photo detection and electric signal processing capabilities, reduces space on PCBs and significantly lowers production costs.

A second aspect of the present invention is directed to a method of interrogating a fiber Bragg grating. The method may comprise providing a fiber Bragg grating having a variable Bragg wavelength and a dynamic range of interest over which the Bragg wavelength can shift during use. The method may also comprise illuminating the fiber Bragg grating to solicit a response therefrom, and splitting the response into a plurality of output channels, each output channel having a respective spectral range. The spectral ranges of each at least three successive output ports of the plurality of output ports may partially overlap, such that the FBG's Bragg wavelength falls inside the spectral ranges of at least three successive output ports over the dynamic range of interest of the FBG.

With regard to the terminology used in this text, the following is noted. The spectral range $\Delta\lambda_n$ of the n-th output port or output channel of the spectrally selective device may be construed to be the wavelength range over which the portion of the spectrally selective device's transmission power spectrum associated with the n-th output port lies within 20 dB, and preferably within 15 dB, of its peak; i.e. above the −20 dB resp. −15 dB level below the peak. A spectral range $\Delta\lambda_n$ may typically be centered on the center wavelength $\lambda_n$ of the respective output port. Output ports may be considered sorted based on their center wavelengths. Accordingly, when output ports A, B, C and D have respective center wavelengths 1548 nm, 1550 nm, 1551 nm, 1549 nm, their successive order is A, D, B, C; i.e. A and D may be considered successive output ports, while A and B may not.

It is understood that although FBGs and fiber Bragg grating response analyzers have interesting and useful applications in the technical field of aerospace, as alluded to above, their use is not limited thereto. The presently disclosed fiber Bragg grating assembly and method may, for instance, be used to monitor the mechanical state of all types of buildings and engineering structures. More generally even, they may be employed in non-distributed or distributed monitoring systems, capable of monitoring not only strain, but also other quantities like temperature, humidity, pressure, etc. In the case of a distributed monitoring system, which may involve a long optical fiber in which a plurality of FBGs are provided at certain intervals, these quantities may conveniently be monitored simultaneously at various locations, for instance at equidistantly spaced apart measuring points down a deep bore hole.

These and other features and advantages of the invention will be more fully understood from the following detailed description of certain embodiments of the invention, taken together with the accompanying drawings, which are meant to illustrate and not to limit the invention.

DETAILED DESCRIPTION OF SPECIFIC EMBODIMENTS

Figure 1:
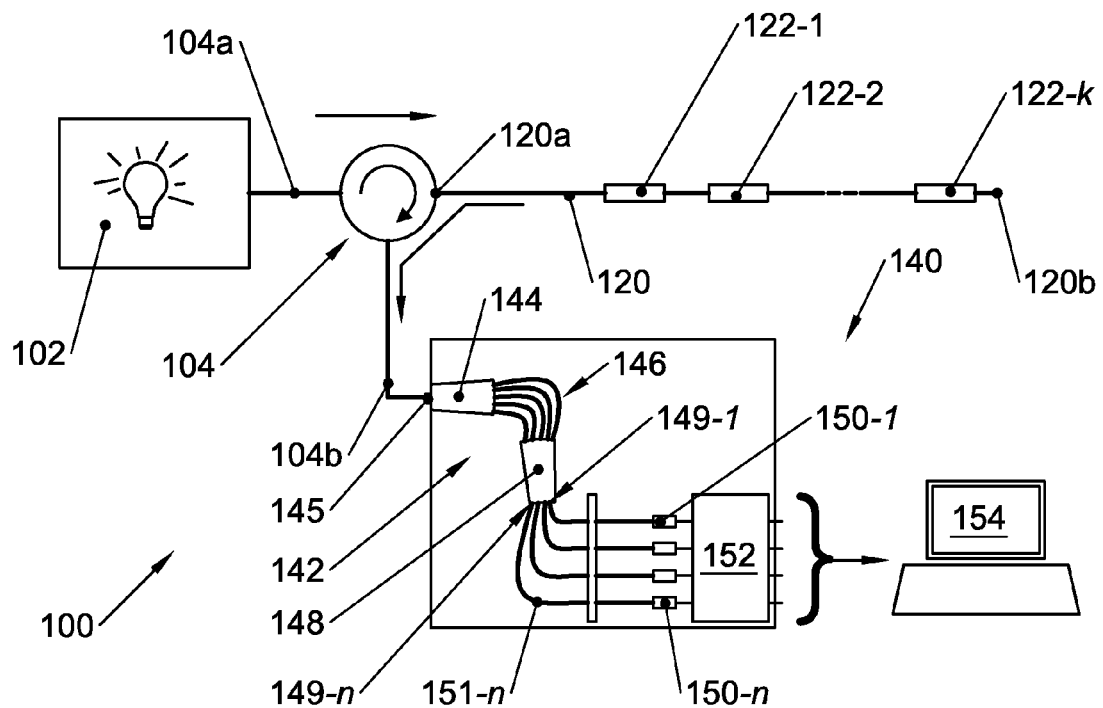
FIG. 1 schematically illustrates an exemplary embodiment of a fiber Bragg grating interrogator assembly according to the present invention.

FIG. 1 schematically illustrates an exemplary embodiment of a fiber Bragg grating interrogator assembly 100 according to the present invention. Below, the assembly 100 will be described in general terms, where appropriate with reference to the embodiment of FIG. 1.

The fiber Bragg grating interrogator assembly 100 may typically include a light source 102, an optical circulator 104, an optical fiber 120 including at least one fiber Bragg grating (FBG) 122, and a response analyzer 140.

The light source 102 may in principle be any light source capable of emitting light in a spectral range that includes the Bragg wavelength (or better: the dynamic range of interest) of the at least one FBG 122. The light source may preferably be a continuous instead of a pulsed light source. In one embodiment, for example, it may be a broad band light source, while in another embodiment, it may be a (continuous) variable wavelength laser that is capable of scanning action under the control of integrated electronics.

In one embodiment of the assembly 100, such as the depicted embodiment, the response analyzer 140 may be configured to process the reflection responses of the at least one FBG 122. In such an embodiment, the optical circulator 104 may serve to operably interconnect the light source 102, a first end 120a of the optical fiber 120, and an input port 145 of the spectrally selective device 142 that forms part of the response analyzer 140. It is understood that the optical circulator 104 may be a three-port device that is designed such that light entering a certain port exits from the next (in cyclic succession). Accordingly, as in the depicted embodiment, the light source 102 may be optically coupled to the first port, the first end 120a of the optical fiber 120 may be optically coupled to the second port, and the input port 145 of the spectrally selective device 142 may be optically coupled to the third port of the optical circulator 104, all such that, in operation, light emitted by the light source 102 is transmitted into the optical fiber 120, while light reflected by the at least one FBG 122 in the optical fiber is transmitted to the input port of the AWG 142.

In another embodiment, the assembly 100 may be configured to feed transmission responses of the at least one FBG 122 to the response analyzer 140. In such an embodiment, the input port 145 of the response analyzer 140 may be connected directly to the second end 120b optical fiber, while the optical circulator 140 may be configured to operably interconnect the light source 120, the first end 120a of the optical fiber 120, and an optical absorber, which may be coupled to its first, second and third ports of the optical circulator 140, respectively.

The optical fiber 120 may extend between a first end 120a and a second end 120b. In between its first and second ends 120a, 120b, it may include at least one, and typically a plurality of k FBGs 122, each of which may yield a response in reaction to illumination by light from the light source 102. A response may be either a reflection response or a transmission response, depending on the configuration of the assembly 100.

In the depicted embodiment, the FBGs 122 are set up to deliver a reflection response. Accordingly, each FBG 122 may be associated with a reflection power spectrum with a respective spectral range $\Delta\lambda_{B,k}$ centered on a respective Bragg wavelength $\lambda_{B,k}$, and a respective dynamic range or interest $\Delta\lambda_{dyn,B,k}$ over which the Bragg wavelength may shift during operation. A width of the spectral range of an FBG 122 (as defined with respect to the 20 dB (and preferred 15 dB) limit in analogy with the spectral range of an output port of the spectrally selective device) may typically be in the range of 0.1-0.2 nm, while a width of the dynamic range of interest may typically be on the order of 1 nm. Different FBGs 122 may preferably have mutually non-overlapping dynamic ranges, such that each FBG may be uniquely associated with specific output ports 149 of the AWG 142, which may thus uniquely register that FBG's reflection power spectrum.

In an embodiment of the assembly 100 wherein the response analyzer 140 is set up to process the reflection responses of the FBG's, such as the depicted embodiment, the second end 120b of the optical fiber 120 may be fitted with an optical absorber to prevent the transmission responses of the FBG's 122 from being reflected at the second end 120b, back to the optical circulator 104 and into the input port 145 of the response analyzer 140.

The response analyzer 140 may include a spectrally selective device 142, which may in principle be of any suitable type. In the depicted exemplary embodiment, the spectrally selective device includes an arrayed waveguide grating (AWG) 142. In other embodiments, however, the spectrally selective device may be of a different type, and for instance include a photonic crystal. The response analyzer 140 may further typically include a plurality of photodetectors 150, an analog-to-digital converter (ADC) 152, and a processing unit 154.

The AWG 142 may include an input light distribution component 144, an output light distribution component 148, and an array 146 of waveguides that optically interconnect the input light distribution component 144 and the output light distribution component 148. The input and output light distribution components 144, 148 may be of any suitable design, and for instance include free space, star couplers, Rowland circles, mode expanders, and/or slab waveguides. The input light distribution component 144 may provide for a single input port 145 that is in optical communication with the (third port of the) optical circulator 104 via an input waveguide 104b, while the output light distribution component 148 may provide for a plurality of n output ports 149. Each output port corresponds to a respective output channel. For clarity of exposition, FIG. 1 schematically depicts an AWG 142 with a total of four output ports 149; it is understood, however, that actual embodiments of the AWG 142 may feature a different number n of output ports 149. This number may preferably be related to the number of FBGs 122 to be interrogated, in particular in such a ratio that each FBG 122 is uniquely associated with at least three output ports 149. As regards the array of waveguides 146, it should be noted that adjacent array waveguides may have a different effective length, the effective length differential $\Delta L$ between adjacent waveguides being constant. Although the array 146 illustrated in FIG. 1 comprises only five wave guides for illustrative purposes, AWGs may typically include more than five waveguides; fewer are also possible.

In operation light reflected by the at least one FBG 122 in the optical fiber 120 may enter the input light distribution component 144 from the input waveguide 104b connected to the input port 145. The input light distribution component 144 may then distribute the light signal to the array waveguides, such that each array waveguide receives a fraction of the light signal, which it carries to the output light distribution component 148. A light signal fraction traveling through a long array waveguide takes longer to enter the output light distribution component 148 than a light signal fraction traveling through a shorter array waveguide. Unless the length differential $\Delta L$ between adjacent array waveguides is a multiple of the wavelength of the light, the light signal fraction traveling through a long array waveguide enters the output light signal distribution in a different phase than the light signal fraction traveling along the shorter waveguide. Consequently, upon entering the output light distribution component 148, the light signal is effectively diffracted at a wavelength dependent diffraction angle, and focused on the different output ports 149. A first output port 149-1 may thus receive light with wavelengths in a first spectral range $\Delta\lambda_1$, a second output port 149-2 may receive light with wavelengths in a second spectral range $\Delta\lambda_2$, etc. The placement of the output ports on the image plane/surface determines the boundaries of their respective spectral ranges.

The spectrally selective device 142 employed in the fiber Bragg grating interrogator assembly 100 according to the present invention may generally be configured such that the respective spectral ranges $\Delta\lambda_n$, $\Delta\lambda_{n+1}$, $\Delta\lambda_{n+2}$ of each at least three successive output ports 149-n, 149-(n+1), 149-(n+2) of a plurality of output ports 149 associated with a certain FBG 122 exhibit a mutual partial overlap. The partial overlap may be such that the FBG's Bragg wavelength $\lambda_B$ falls inside the spectral ranges $\Delta\lambda_n$, $\Delta\lambda_{n+1}$, $\Delta\lambda_{n+2}$ of at least three successive output ports over the dynamic range of interest $\Delta\lambda_{dyn,B}$ of the FBG 122. A suitable arrangement may, for instance, be obtained by using output ports with spectral ranges of equal width, wherein consecutive spectral ranges are offset relatively to each other by one third of that width. Thus, when a first output port 149-1 has a spectral range $\Delta\lambda_1$ extending from wavelength $\lambda_1$ to wavelength $\lambda_{1'}$, then the second output port 149-2 may have a spectral range $\Delta\lambda_2$ extending from $\lambda_{1}+(\frac{1}{3})(\lambda_{1'}-\lambda_1)$, while the third output port 149-3 may have a spectral range $\Delta\lambda_3$ extending from $\lambda_{1}+(\frac{2}{3})(\lambda_{1'}-\lambda_1)$, etc. To increase the sensitivity of the assembly 100 to changes in the Bragg wavelength, a preferred embodiment may even be configured such that the respective spectral ranges $\Delta\lambda_n$, $\Delta\lambda_{n+1}$, $\Delta\lambda_{n+2}$, $\Delta\lambda_{n+3}$ of each at least four successive output ports 149-n, 149-(n+1), 149-(n+2), 149-(n+3) of the plurality of output ports 149-n exhibit a mutual partial overlap, while the FBG's Bragg wavelength $\lambda_B$ falls inside the spectral ranges $\Delta\lambda_n$, $\Delta\lambda_{n+1}$, $\Delta\lambda_{n+2}$, $\Delta\lambda_{n+3}$ of at least four successive output ports over the dynamic range of interest $\Delta\lambda_{dyn,B}$ of the FBG 122.

As regards the use of an AWG-based spectrally selective device 142, it may be noted that although the technology of AWGs is in itself known in the art, AWGs are mainly used (and developed) as demultiplexers in the field of optical telecommunications, in particular for use in wavelength-division multiplexing (WDM) systems. Such AWG's are generally neither configured nor suitable for use in the presently disclosed interrogator assembly 100. This is because AWG demultiplexers for use in WDM systems serve to split an optical signal of different wavelengths in different non-overlapping channels, since the information contents of different channels have no bearing on one another. Accordingly, AWG demultiplexers are normally configured such that the spectral ranges of their output ports—as defined above with regard to the 20 dB (and preferred 15 dB) limit—do not overlap, while such overlap is a practical necessity for an AWG to be used in the presently disclosed interrogator assembly.

Each of the output ports 149-n of the spectrally selective device 142 may be in optical communication, for instance via a respective waveguide 151-n, with a respective photodetector 150-n, such as a photodiode. Each of the photodetectors 150-n may be configured to convert a light signal, in particular light reflected or transmitted by an associated FBG 122-k, into an electric signal indicative of a strength of the light signal. The signal may be an analog signal, in which case the signal may be sampled by the ADC 152, and converted into digital form. The optionally digitized electric signals of the photodetectors 150-$n$ may be fed to the processing unit 154 for analysis.

In FIG. 1, the processing unit 154 is schematically depicted as a personal computer for ease of recognition. It is understood, however, that the processing unit 154 may essentially comprise little more than a processor or IC programmed to analyze power ratios that exist between the output ports 149 associated with a certain FBG 122, and to determined a current Bragg wavelength $\lambda_B$ of that FBG from those power ratios, optionally using knowledge of the shape of the power spectrum of the FBG.

Figure 2:
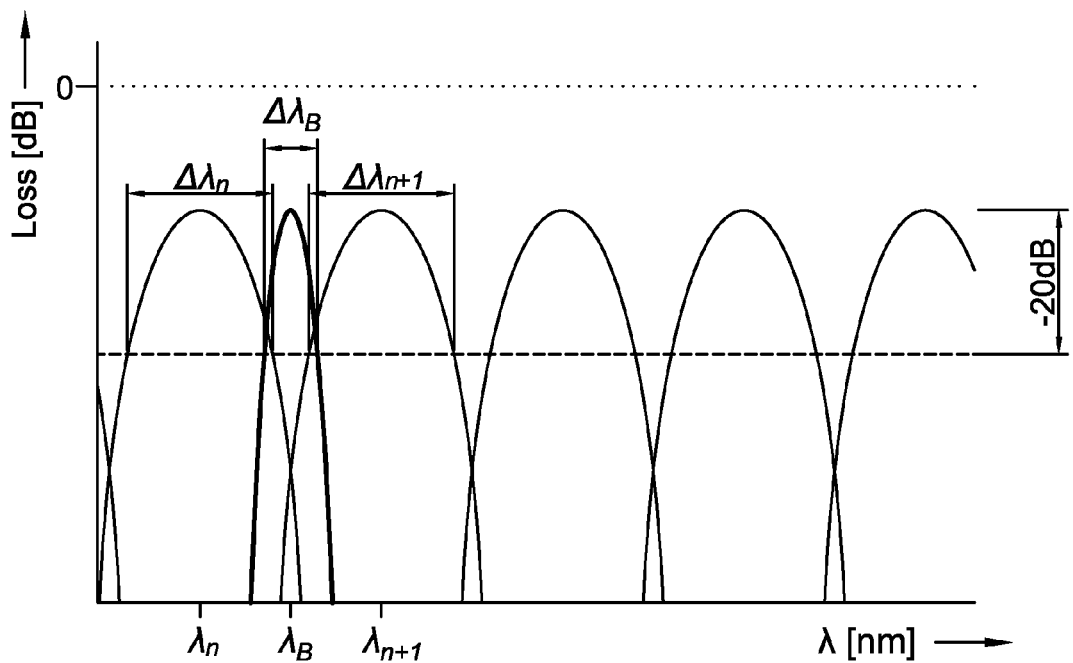
FIG. 2 schematically illustrates a partial transmission power spectrum of a spectrally selective device of a conventional fiber Bragg grating interrogator assembly similar to that shown in FIG. 1, including a power spectrum of an interrogated fiber Bragg grating.

FIG. 2 schematically illustrates a partial transmission power spectrum of a conventional AWG-based FBG interrogator assembly, including a (reflection or transmission) power spectrum of an interrogated FBG. The diagram, which serves to illustrate qualitative properties, is not drawn to scale.

As may be inferred from FIG. 2, the AWG in question includes a plurality of output ports, each giving rise to an inverted-parabola-like transmission curve in the transmission power spectrum. A first of them is centered on a wavelength $\lambda_n$, while a second, adjacent one is centered on a wavelength $\lambda_{n+1}$. As indicated in the Figure, the first and second transmission curves have respective, non-overlapping spectral ranges $\Delta\lambda_n$ and $\Delta\lambda_{n+1}$.

The FBG interrogator assembly is configured such that the Bragg wavelength $\lambda_B$ of the interrogated FBG is situated between the respective center wavelengths $\lambda_n, \lambda_{n+1}$ of the two associated output ports n and n+1 of the AWG, such that the spectral range $\Delta\lambda_B$ of the FBG partially overlaps with the spectral ranges $\Delta\lambda_n$ and $\Delta\lambda_{n+1}$ of those output ports. Accordingly, the light reflected by the FBG upon interrogation is divided between those output ports. When during use the Bragg wavelength $\lambda_B$ of the FBG changes due to the fact that it is strained, the FBG's response curve will shift accordingly, and the power ratio between the two output ports will change. This change in power ratio may for determination of the direction in which the Bragg wavelength $\lambda_B$ of the FBG has shifted, and possibly also the magnitude of the shift.

As mentioned, however, the response analyzer setup reflected by FIG. 2 embodies two important drawbacks. One drawback is that the sensitivity of the response analyzer is generally greatest when the initial Bragg wavelength $\lambda_B$ is located precisely between the center wavelengths $\lambda_n, \lambda_{n+1}$ of the two associated output ports n, n+1 of the AWG. Unfortunately, it is rather difficult to attach an FBG to a structure to be monitored in such a way that the FBG wavelength is matched to the AWG response. Accordingly, an interrogator assembly with a freshly installed FBG may generally have a less than optimal sensitivity. As a countermeasure one may adjust the center wavelengths of the output ports of the AWG by means of a temperature controller associated therewith, but this complicates the structure and operation of the response analyzer. Another drawback is that an FBG may preferably have a relatively large dynamic range over which its Bragg wavelength may shift during use. Consequently, a current Bragg wavelength may easily shift outside the spectral range of its two associated output ports.

The presently disclosed interrogator assembly overcomes these drawbacks. As explained above, an FBG 122 in the presently disclosed FBG interrogator assembly 100 may not be associated with two output ports having non-overlapping spectral ranges, but with a plurality of output ports 149, wherein the spectral ranges of each at least three successive output ports partially overlap, such that the FBG's Bragg wavelength falls inside the spectral ranges of at least three successive output ports over the dynamic range of interest of the FBG. That is, such that over the FBG's entire dynamic range, the power of its response is divided between at least three successive output ports.

Figure 3:
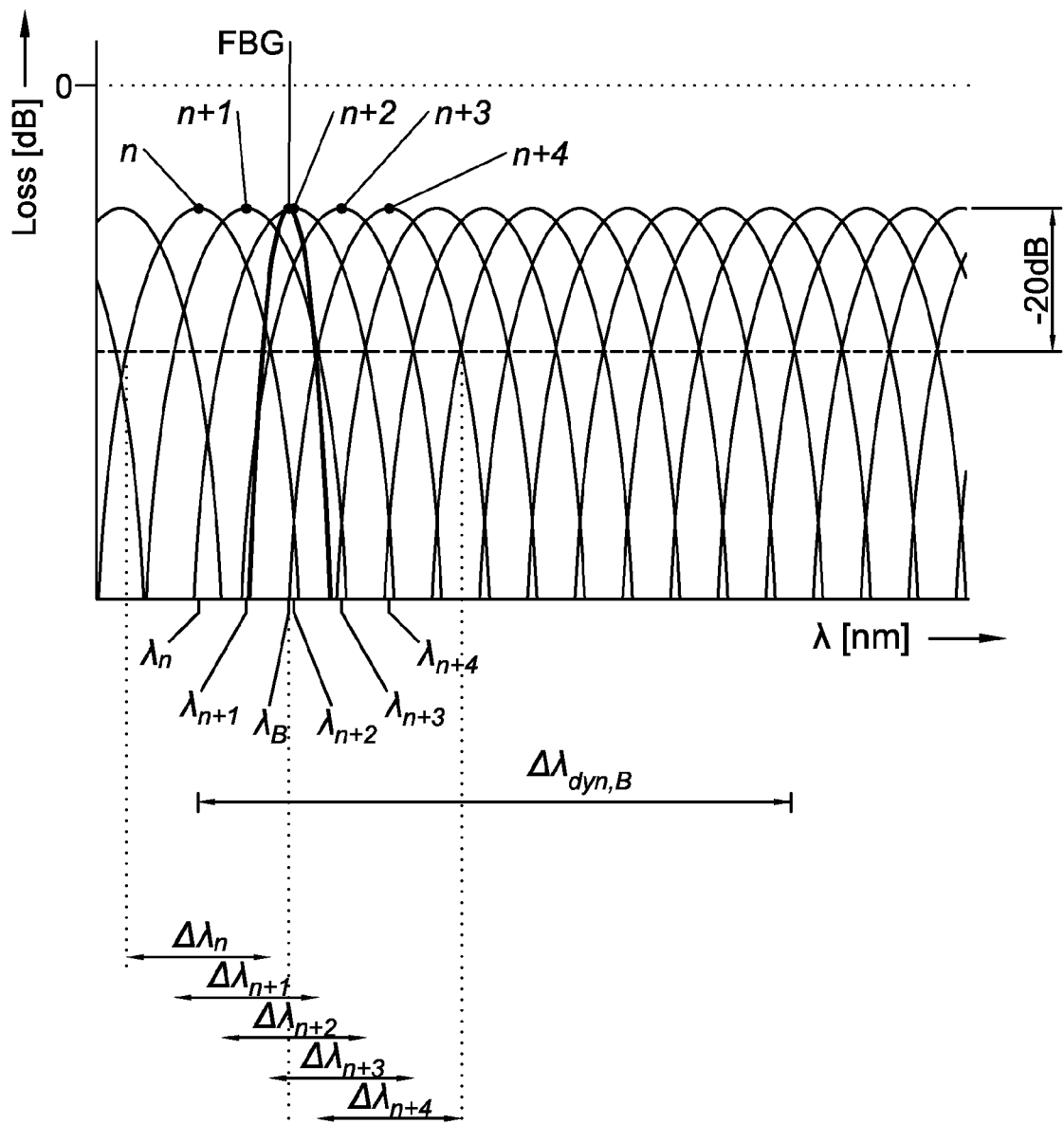
FIG. 3 schematically illustrates a partial transmission power spectrum of the spectrally selective device of the fiber Bragg grating interrogator assembly according to the present invention shown in FIG. 1, including a (reflection) power spectrum of an interrogated fiber Bragg grating.

The new configuration of the interrogator assembly 100 may be schematically illustrated by the diagram of FIG. 3, which depicts a partial transmission power spectrum of the spectrally selective device of the assembly, and a reflection power spectrum of an interrogated FBG.

As may be inferred from FIG. 3, the AWG 142 of the interrogator assembly 100 in question includes a plurality of output ports 149, each giving rise to an inverted-parabola-like transmission curve in the transmission power spectrum. In FIG. 3, the transmission curves belonging to different output ports are identical in shape, but although this is a generally desirable quality, this need not necessarily be the case in other embodiments. Five arbitrary successive transmission curves have been labeled with the numbers of their respective output ports 149: n, n+1, n+2, n+3, n+4. The first of these five ports is centered on a wavelength $\lambda_n$; the second is centered on a wavelength $\lambda_{n+1}$, etc. As illustrated below the actual diagram in FIG. 3, the respective spectral ranges $\Delta\lambda_n, \ldots \Delta\lambda_{n+4}$ of each three successive output ports n, ..., n+4, exhibit a partial overlap: the spectral range $\Delta\lambda_n$ of the first output port partially overlaps with the spectral ranges $\Delta\lambda_{n+1}$ and $\Delta\lambda_{n+2}$ of the ports n+1 and n+2, etc.

The reflection curve of the interrogated FBG is labeled 'FBG'. Because of the spectral arrangement of the output ports 149, the Bragg wavelength $\lambda_B$ of the FBG 122 falls within the spectral ranges of at least three successive output ports of the plurality of output ports. In the depicted situation, for instance, the Bragg wavelength $\lambda_B$ of the FBG falls within the spectral ranges $\Delta\lambda_{n+1}, \Delta\lambda_{n+2}$ and $\Delta\lambda_{n+3}$ of the output ports 149 numbered n+1, n+2 and n+3. It will be clear from FIG. 3 that this situation does not fundamentally change when the Bragg wavelength $\lambda_B$ of the FBG shifts during operation, e.g. within the indicated dynamic range of interest $\Delta\lambda_{dyn,B}$ of the FBG: at any given Bragg wavelength $\lambda_B$ within the dynamic range $\Delta\lambda_{dyn,B}$, the FBG's Bragg wavelength will fall within the spectral ranges of at least three successive output ports. Consequently, the light reflected by the FBG upon interrogation is always divided between those output ports.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

What is claimed is:

1. A fiber Bragg grating interrogator assembly, comprising:
   an optical fiber including a fiber Bragg grating having a variable Bragg wavelength ($\lambda_B$) and a dynamic range of interest ($\Delta\lambda_{dyn,B}$) over which the Bragg wavelength ($\lambda_B$) can shift during use;
   a light source operably connected to the optical fiber, and configured to illuminate the fiber Bragg grating to solicit a response therefrom; and
   a response analyzer, including:
      a spectrally selective device having an input port and a plurality of output ports, wherein the input port is operably connected to the optical fiber and wherein each of the output ports is associated with a respective spectral range ($\Delta\lambda_n$), the spectrally selective device being configured to provide a spectral energy distribution of a response of the FBG received on the input port onto the output ports;
   wherein the respective spectral ranges ($\Delta\lambda_n$, $\Delta\lambda_{n+1}$, $\Delta\lambda_{n+2}$) of each at least three successive output ports of the plurality of output ports exhibit a mutual partial overlap, such that the FBG's Bragg wavelength ($\lambda_B$) falls inside the spectral ranges ($\Delta\lambda_n$, $\Delta\lambda_{n+1}$, $\Delta\lambda_{n+2}$) of at least three successive output ports over the dynamic range of interest ($\Delta\lambda_{dyn,B}$) of the FBG.

2. The fiber Bragg grating interrogator assembly according to claim 1, wherein the spectral ranges ($\Delta\lambda_n$, $\Delta\lambda_{n+1}$, $\Delta\lambda_{n+2}$, $\Delta\lambda_{n+3}$) of each at least four successive output ports of the plurality of output ports partially overlap, such that the FBG's Bragg wavelength ($\lambda_B$) falls inside the spectral ranges ($\Delta\lambda_n$, $\Delta\lambda_{n+1}$, $\Delta\lambda_{n+2}$, $\Delta\lambda_{n+3}$) of at least four successive output ports over the dynamic range of interest ($\Delta\lambda_{dyn,B}$) of the FBG.

3. The fiber Bragg grating interrogator assembly according to claim 1, wherein the spectrally selective device comprises an arrayed wave guide grating.

4. The fiber Bragg grating interrogator assembly according to claim 1, further comprising:
   a plurality of photodetectors optically coupled to the plurality of output ports (149-$n$) in a one-to-one relationship, wherein each photodetector is configured to generate a signal indicative of an intensity of an optical signal received at the respective output port; and
   a processing unit, operably connected to the plurality of photodetectors (149-$n$), and configured to determine a current Bragg wavelength of the FBG from the signals of the photodetectors.

5. The fiber Bragg grating interrogator assembly according to claim 4, wherein the processing unit is configured to determine the current Bragg wavelength as an intensity-weighted mean wavelength.

6. The fiber Bragg grating interrogator assembly according to claim 1, wherein the dynamic range of interest has a width in the range of 0.2-2 nm.

7. The fiber Bragg grating interrogator assembly according to claim 1, wherein the response solicited from the FBG and received on the input port is a transmission response.

8. The fiber Bragg grating interrogator assembly according to the claim 1, wherein the response solicited from the FBG and received on the input port is a reflection response.

9. The fiber Bragg grating interrogator assembly according to claim 8, further comprising an optical circulator, wherein the light source, the optical fiber and the input port of the spectrally selective device are operably interconnected via the optical circulator, such that—via the optical circulator—light emitted by the light source is transmitted into the optical fiber, and light reflected by the FBG in the optical fiber is transmitted to the input port.

10. The fiber Bragg grating interrogator assembly according to claim 1, wherein the optical fiber includes a plurality of FBGs, each FBG having a variable Bragg wavelength ($\lambda_{B,k}$) and a dynamic range of interest ($\Delta\lambda_{dyn,B,k}$) over which the respective Bragg wavelength ($\lambda_{B,k}$) can shift during use,
   wherein the FBGs have mutually non-overlapping dynamic ranges ($\Delta\lambda_{dyn,B,k}$); and
   wherein each FBG is uniquely associated with a plurality of output ports.

11. The fiber Bragg grating interrogator assembly according to claim 1, wherein the response analyzer is embodied by an optical-electronic integrated circuit.

12. A method of interrogating a fiber Bragg grating, comprising:
   providing a fiber Bragg grating having a variable Bragg wavelength ($\lambda_B$) and a dynamic range of interest ($\Delta\lambda_{dyn,B}$) over which the Bragg wavelength ($\lambda_B$) can shift during use;
   illuminating the fiber Bragg grating to solicit a response therefrom; and
   splitting the response into a plurality of output channels (149-$n$), each output channel having a respective spectral range ($\Delta\lambda_n$),
   wherein the spectral ranges ($\Delta\lambda_n$, $\Delta\lambda_{n+1}$, $\Delta\lambda_{n+2}$) of each at least three successive output ports of the plurality of output ports (149-$n$) partially overlap, such that the FBG's Bragg wavelength ($\lambda_B$) falls inside the spectral ranges ($\Delta\lambda_n$, $\Delta\lambda_{n+1}$, $\Delta\lambda_{n+2}$) of at least three successive output ports over the dynamic range of interest ($\Delta\lambda_{dyn,B}$) of the FBG.

13. The method according to claim 12, further comprising:
   determining a current Bragg wavelength as an intensity-weighted mean wavelength based on intensity measurements of the partial responses of the FBG received on the output channels.

14. The method according to claim 12, wherein the FBG's response is split by an arrayed waveguide.

15. The method according to claim 12, at least partly carried out by an optical-electronic integrated circuit.

* * * * *